(12) United States Patent
Chen (10) Patent No.: US 11,812,766 B2
(45) Date of Patent: *Nov. 14, 2023

(54) EDIBLE PET CHEW AND METHOD OF MANUFACTURE THEREOF

(71) Applicant: Xiang Chen, Wenzhou (CN)

(72) Inventor: Xiang Chen, Wenzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,730

(22) Filed: Mar. 28, 2022

(65) Prior Publication Data

US 2022/0211078 A1 Jul. 7, 2022

Related U.S. Application Data

(60) Division of application No. 16/291,855, filed on Mar. 4, 2019, now abandoned, which is a continuation-in-part of application No. 15/061,098, filed on Mar. 4, 2016, now Pat. No. 10,219,529.

(51) Int. Cl.
| | | |
|---|---|---|
| A23K 40/25 | (2016.01) | |
| A23K 20/179 | (2016.01) | |
| A23K 20/105 | (2016.01) | |
| A23K 50/42 | (2016.01) | |
| A23K 10/30 | (2016.01) | |
| A23K 10/20 | (2016.01) | |
| A23K 40/30 | (2016.01) | |
| A23K 20/147 | (2016.01) | |
| A23K 20/163 | (2016.01) | |
| A23K 10/26 | (2016.01) | |
| A23P 20/10 | (2016.01) | |

(Continued)

(52) U.S. Cl.
CPC ............ *A23K 40/25* (2016.05); *A01K 15/026* (2013.01); *A23K 10/20* (2016.05); *A23K 10/26* (2016.05); *A23K 10/30* (2016.05); *A23K 20/105* (2016.05); *A23K 20/147* (2016.05); *A23K 20/163* (2016.05); *A23K 20/179* (2016.05); *A23K 40/30* (2016.05); *A23K 50/42* (2016.05); *A23P 20/10* (2016.08); *A23P 30/20* (2016.08)

(58) Field of Classification Search
CPC ........ A23K 40/25; A23K 10/26; A23K 10/30; A23K 20/105; A23K 20/147; A23K 20/163; A23K 20/179; A23K 40/30; A23K 50/42; A23K 10/20–10/38; A23K 43/30; A01K 15/026; A23P 20/10; A23P 30/20
See application file for complete search history.

(56) References Cited

U.S. PATENT DOCUMENTS

| | | | | |
|---|---|---|---|---|
| 4,163,804 A | * | 8/1979 | Meyer | ...................... A23L 13/67 |
| | | | | 426/805 |
| 5,045,339 A | * | 9/1991 | Ducharme | .............. A23K 40/25 |
| | | | | 426/805 |

(Continued)

*Primary Examiner* — Drew E Becker
(74) *Attorney, Agent, or Firm* — Ashok Tankha (57) ABSTRACT

An aspect of some embodiments of the present invention relates to an edible pet chew including an inner chew part made of a first mixture, the first mixture including, by weight: between 5% and 30% or between 30% and 70% of starch; between 5% and 30% of animal meat if the starch is 30% to 70% of the weight of the first mixture, or between 30% and 70% of animal meat if the starch is 5% to 30% of the weight of the first mixture; between 2% and 20% of gelatin and/or xanthan gum; between 5% and 25% of vegetable protein; between 2% and 10% of glycerin.

11 Claims, 4 Drawing Sheets

(51) Int. Cl.
*A23P 30/20* (2016.01)
*A01K 15/02* (2006.01)

(56) References Cited

U.S. PATENT DOCUMENTS

| | | | | |
|---|---|---|---|---|
| 6,455,083 | B1* | 9/2002 | Wang | A23P 30/34 426/805 |
| 10,219,529 | B2* | 3/2019 | Chen | A23K 10/22 |
| 2003/0219516 | A1* | 11/2003 | Pater | A23K 40/20 426/132 |
| 2004/0086616 | A1* | 5/2004 | Nie | A23K 40/20 426/549 |
| 2004/0224065 | A1* | 11/2004 | Markham | A01K 1/03 426/619 |
| 2006/0083834 | A1* | 4/2006 | Shah | A23K 10/37 426/518 |
| 2006/0188611 | A1* | 8/2006 | Unlu | A23K 40/20 426/89 |
| 2006/0292288 | A1* | 12/2006 | Russell Maynard | A23K 50/40 426/658 |
| 2007/0292594 | A1* | 12/2007 | Levin | A23K 20/105 426/656 |
| 2008/0063775 | A1* | 3/2008 | Liu | A23K 50/42 426/456 |
| 2008/0185746 | A1* | 8/2008 | Axelrod | A23K 40/25 119/710 |
| 2009/0280216 | A1* | 11/2009 | Fumita | A23K 40/20 426/62 |
| 2014/0295052 | A1* | 10/2014 | Elliott | A23K 50/40 426/656 |
| 2015/0086679 | A1* | 3/2015 | Seguin | A23K 10/20 426/574 |
| 2015/0282504 | A1* | 10/2015 | Andersen | A23K 50/48 426/546 |
| 2017/0181448 | A1* | 6/2017 | Harbour | A23K 40/30 |

* cited by examiner

EDIBLE PET CHEW AND METHOD OF MANUFACTURE THEREOF

CROSS-REFERENCES TO RELATED APPLICATIONS

The present application is a divisional application of U.S. patent application Ser. No. 16/291,855, filed on Mar. 4, 2019, which is a continuation-in-part (CIP) application of U.S. patent application Ser. No. 15/061,098, filed on Mar. 4, 2016, which matured into U.S. Pat. No. 10,219,529 and is hereby incorporated herein by reference in its entirety.

TECHNICAL FIELD

The present application, in some embodiments thereof, relates to edible pet chews.

BACKGROUND

Many types of edible dog chews are available on the market. These chews often do not last long, are unhealthy or are expensive to manufacture.

One type of dog chew on the market is NO HIDE™ chicken chews manufactured by Earth Animal. These chews include chicken, chicken gelatin, brown rice flour, organic eggs and olive oil. The chicken is rolled out and baked with organic eggs and olive oil.

BRIEF SUMMARY OF THE INVENTION

An aspect of some embodiments of the present invention relater to an edible pet chew comprising an inner chew part made of a first mixture, the first mixture comprising, by weight: between 5% and 30% or between 30% and 70% of starch; between 5% and 30% of animal meat if the starch is 30% to 70% of the weight of the first mixture, or between 30% and 70% of animal meat if the starch is 5% to 30% of the weight of the first mixture; between 2% and 20% of gelatin and/or xanthan gum; between 5% and 25% of vegetable protein; between 2% and 10% of glycerin.

In a variant, the first mixture further comprises weight between 3% and 20% of pea flour by weight.

In another variant, the first mixture further comprises, by weight between 2% and 10% of fruit.

In yet another variant, the first mixture further comprises, by weight, at least one of the following: between 0.3% and 1% of coloring and between 0.05% and 0.2% of sorbic acid.

In a further variant, the inner chew part has a cylindrical shape.

The inner chew part may have a spiral cross section, wherein a spiraling layer has a thickness between 2 and 15 millimeters and is malleable at the thickness between 2 and 15 millimeters.

In yet a further variant, the edible chew further comprises an outer coating covering at least a portion of the inner chew part, the outer coating being made of a second mixture, which comprises, by weight: between 85% and 88% of animal meat; between 5% and 7% of glycerin; and between 5% and 8% of starch.

In a variant, the outer coating forms 8% to 15% percent of a total weight of the edible chew and the inner chew material 85 to 92% of the total weight of the edible chew In another variant, the starch comprises at least one of: corn starch, wheat flour, sweet potato flour, tapioca flour, potato flour, rice flour.

In a further variant, the first mixture is cooked the first mixture at a temperature between 70 and 150 degrees Centigrade. Following the cooking, the first mixture is extruded into one or more strips. The one or more strips are partially dried. The partially dried strips are ground into grains, each grain having a maximal dimension of 3 cm. The grains are fed into an extruder, elongated cylindrical shape is extruded from the extruder and cut into one or more pieces, each piece forming an inner chew part Another aspect of some embodiments of the present invention relates to a method for manufacturing an edible chew. The method comprises: (i) providing a first mixture having, comprising at least: starch in a weight percentage of 5% to 30% or in a weight percentage of 30% to 70% of the first mixture; animal meat in a weight percentage of 5% to 30% if the weight percentage of the starch is 30% to 70% of the first mixture, or in a weight percentage of 30% to 70% of the first mixture if the weight percentage of the starch is 5% to 30% of the first mixture; gelatin and/or xanthan gum in a weight percentage of 2% to 20% of the first mixture; vegetable protein in a weight percentage of 5% to 25% of the first mixture; glycerin in a weight percentage of 2% to 10% of the first mixture; (ii) cooking the first mixture at a temperature between 70 and 150 degrees Centigrade; (iii) following the cooking, extruding the first mixture into one or more strips; (iv) partially drying the one or more strips; (v) grinding the one or more strip into grains; (vi) feeding a plurality of the grains into an extruder, extruding therefrom an elongated cylindrical shape, and cutting the elongated cylindrical shape into one or more pieces, each piece being an inner chew part.

In a variant, the method further comprises: providing a second mixture in syrup form, the second mixture comprising animal meat, glycerin, and starch; coating the inner chew part with the second mixture; drying the inner chew part coated with the second mixture.

The second mixture may comprise: the animal meat in a weight percentage between 85% and 88% of the second mixture; the glycerin in a weight percentage between 5% and 7% of the second mixture; the starch in a weight percentage between 5% and 8% of the second mixture.

In a variant, the first mixture further comprises pea flour in a weight percentage of 3% to 20% of the first mixture.

In a variant, the first mixture comprises at least one of the following: fruit in a weight percentage of 2% to 10% of the first mixture; coloring in a weight percentage of 0.3% to 1% of the first mixture; and sorbic acid in a weight percentage of 0.05% to 0.2% of the first mixture.

In another variant, each grain has a maximal dimension of 3 cm.

In yet another variant, each grain having a maximal dimension between 3 millimeters and 7.5 millimeters.

In a further variant, partially drying the strip comprises drying the strip until the strip has between 25% and 30% of water content.

Optionally, partially drying the strip comprises drying the strip in open air at a temperature between 25 and 70 degrees Centigrade.

In yet a further variant, drying the inner chew part coated with the second mixture comprises drying the strip at a temperature between 60 and 70 degrees Centigrade until the inner chew part and the second mixture have water content below 15%.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference The prior art chicken chews are expensive to manufacture, due both to the method and the large amount of chicken.

An aspect of some embodiments of the present invention relates to a method for manufacturing an edible pet chew comprising the steps of:

a. extruding a first edible mixture through a mold having an opening in a first direction to form a lengthened chew interior material;

b. cutting the lengthened chew interior material into defined lengths to form at least one cut chew interior material;

c drying the cut chew interior material to form a chew interior; and d. coating the chew interior with a second edible mixture different from the first edible mixture.

In some embodiments of the present invention, the first edible mixture is a starch-based mixture, and may include plant-based starches such as corn starches, wheat flour, sweet potato, tapioca flour, potato, or rice flour. The weight percentage of plant-based starches of the first edible mixture preferably is over 50 percent and most preferable over 60 percent.

In some embodiments of the present invention, the first edible mixture also contains an animal meat, such as fresh beef, chicken or fish, preferably in a weight percentage of 5 to 30 percent of the first edible mixture. In some embodiments of the present invention, the first edible mixture also contains an animal meat, such as fresh beef, chicken or fish, preferably in a weight percentage of 30 to 70 percent of the first edible mixture.

In some embodiments of the present invention, the first edible mixture is cooked prior to the extrusion, for example at atmospheric pressure at a temperature of 100 to 110 degrees Celsius.

The length of the lengthened chew interior material may be at least 0.5 meters, and may be about 1 meter. The defined lengths preferably are between 5 and 20 centimeters.

The chew interior material may be extruded to have a cylindrical shape, with interior lengthwise through openings, and optionally has a diameter of between 1 and 6 centimeters. Most preferably, the chew interior material has a spiral shaped cross section. The spiral shape or through openings aid chewability of the pet chew The second edible mixture may be fresh meat, such as beef, pork, poultry or fish, mixed with glycerin and a starch, such as rice flour to form a syrup. The syrup sticks to the chew interior upon dipping without the need for further ingredients.

The entire pet chew may then be dried in an oven, preferably between 60 to 70 degrees Celsius, until the water percentage is less than 15%, and preferably between 10 and 13%.

The pet chew may then be sterilized in the oven at a temperature of for example between 90 and 100 degrees Celsius and then packed.

Another aspect of some embodiments of the present invention relates to a method for manufacturing an edible dog chew comprising the steps of:

a. extruding a first edible mixture through a mold having an opening with a cylindrical outer shape and at least one mold projection projecting radially into the opening, the extruding taking place in a first direction to form a lengthened chew material;

b. cutting the lengthened chew material into defined lengths to form at least one cut chew material;

c. drying the cut chew material.

The length of the lengthened chew material may be at least 0.5 meters, and may be about 1 meter. The defined lengths may be between 5 and 20 centimeters.

The chew material may have an interior lengthwise through openings created by the mold projection, and may have an outer diameter of between 1 and 6 centimeters. In a variant, the chew material has a spiral shaped cross section. The spiral shape or through openings aid chewability of the pet chew.

The present invention also provides an edible dog chew comprising: a dried extruded edible mixture having a cylindrical outer circumference and a lengthwise through opening; and a coating on the outer circumference.

The coating optionally also coats the ends of the edible mixture to close the through openings and enter at least partly into the through openings.

Figure 1:
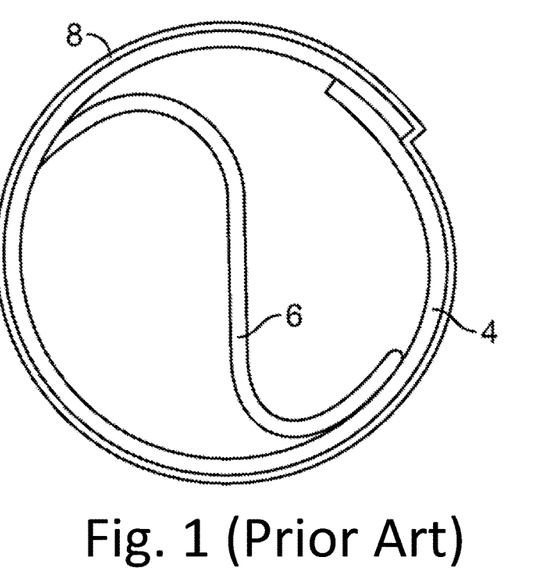
FIG. 1 shows a prior art dog chew.

Referring now to FIG. 1, a cross section of a pet chew as known in the art is shown. A first chew part 4 of circular cross section is rolled and coated on its outer circumference and at the ends with a coating 8. The first chew part 4 surrounds a curled inner chew part 6.

Figure 2:
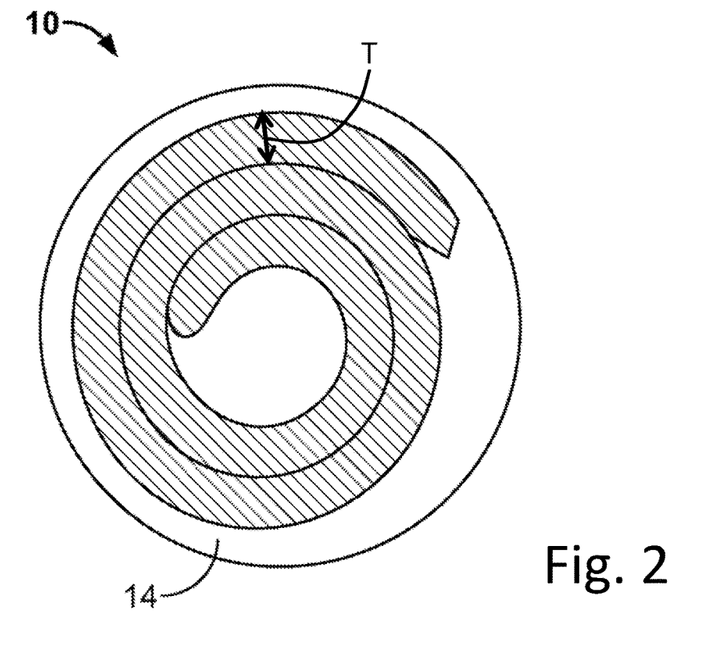
FIG. 2 is a cross sectional view of a pet chew, according to some embodiments of the present invention.

FIG. 2 shows a cross section of one embodiment of the dog chew 10 according to the present invention, having a chew interior 12 and a coating 14 coating the chew interior 12. The rolled material of chew interior 12 is a layer a thickness T. In some embodiments of the present invention, the thickness T is at least 2 millimeters and at most 15 millimeters.

Figure 5:
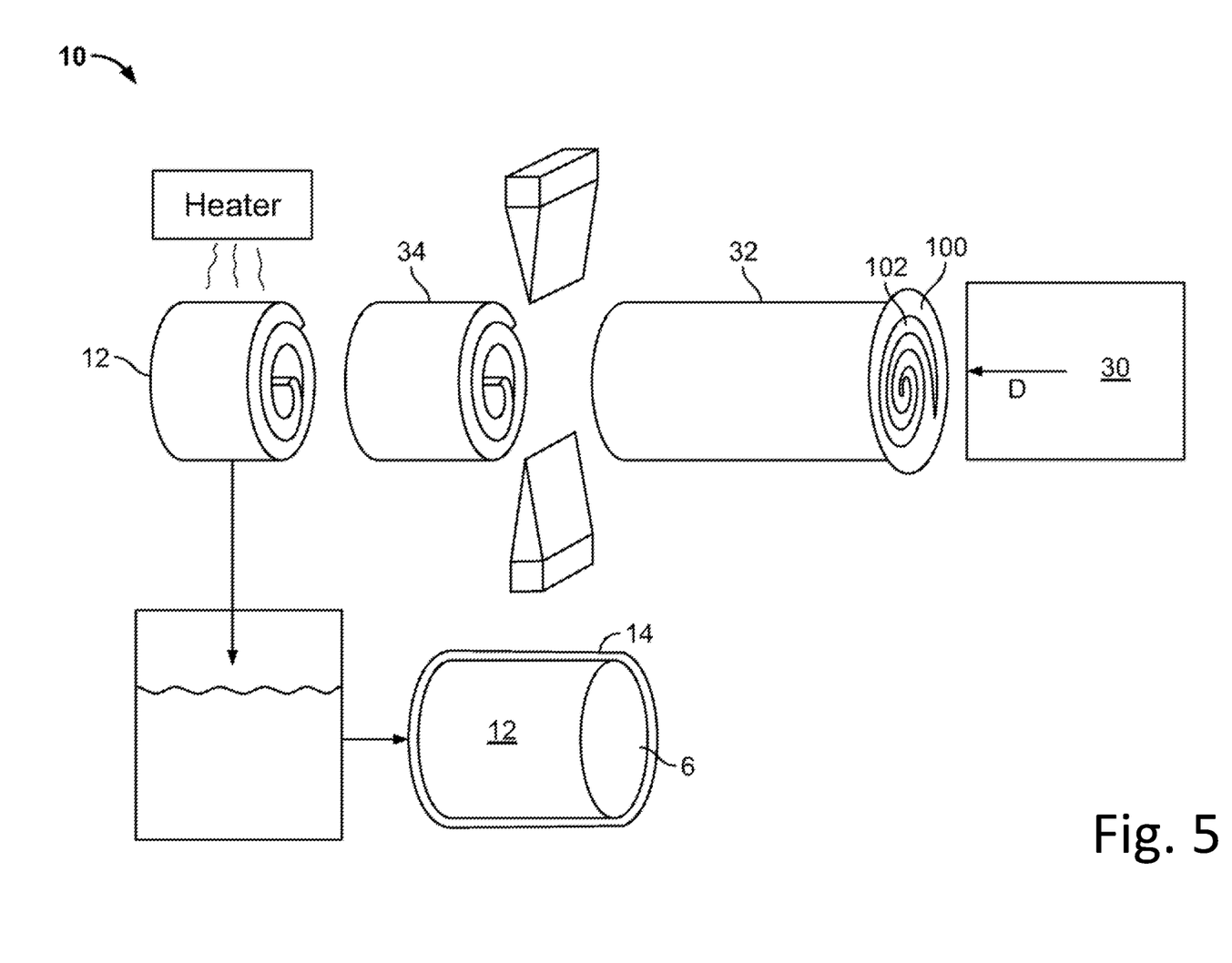
FIG. 5 shows the lengthened chew interior material, being cut and then dipped, in schematic form.
Figure 6:
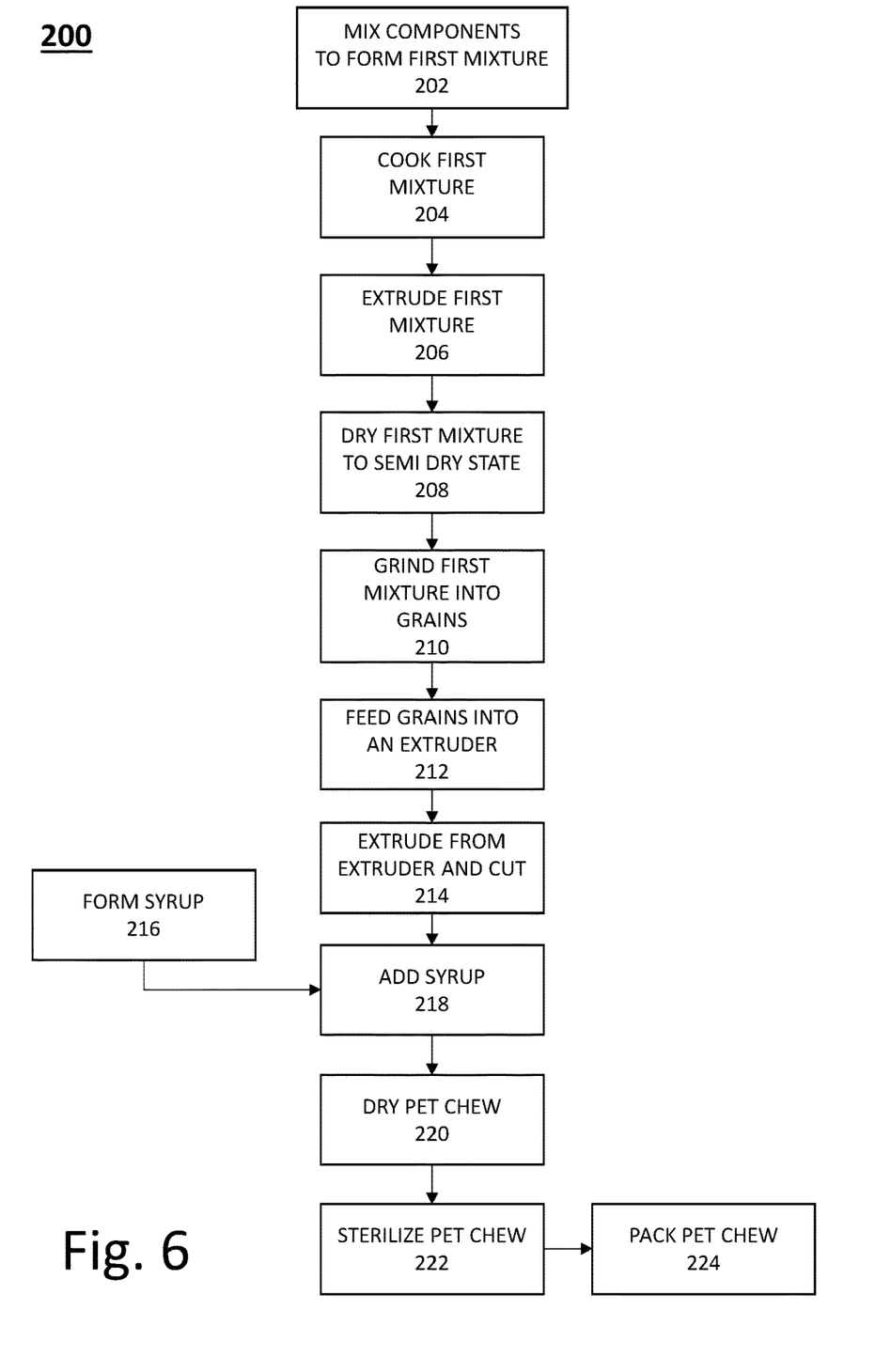
FIG. 6 is a flowchart illustrating a method for manufacturing a pet chew, according to some embodiments of the present invention.

As shown schematically in FIG. 5, chew interior 12 is formed by pressing a cooked, starch-based first edible mixture 30 through a mold 100 having an opening 102 in a first direction D to form a lengthened chew interior material 32 with a thickness T. In some embodiments of the present invention, the thickness T is between 2 and 15 millimeters. The lengthened chew interior material 32 is then cut into defined lengths 34 to form at least one cut chew interior material 34. The chew interior material is then dried to form a chew interior 12. The chew interior 12 is then coated by dipping the chew interior 12 in a second edible mixture 40, so that a coating 14 sticks to the chew interior 12. A portion of the coating 14 may enter into at least one through opening at the ends of the chew interior 12, and help seal any crease or opening at the outer circumference of the chew interior 12. The pet chew may then be baked in an oven, and afterwards sterilized in the oven and then packed.

Figure 3:
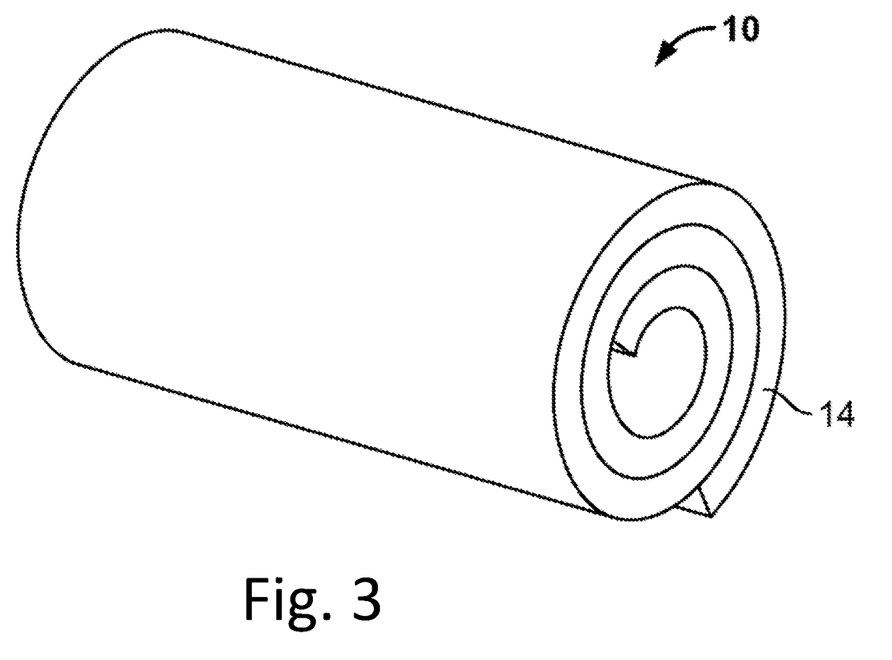
FIG. 3 is a perspective view of the pet chew of FIG. 2, according to some embodiments of the present invention.

FIG. 3 shows a perspective view of the embodiment of FIG. 2, with an end of the pet chew shown coated by coating 14.

Figure 4:
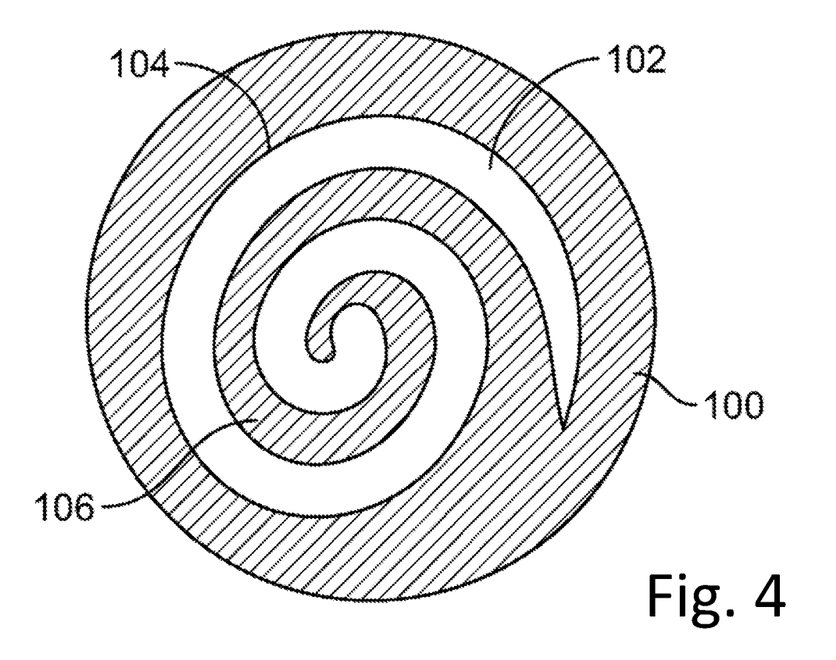
FIG. 4 illustrates an example of a mold used to form the interior of the pet chew of FIG. 2, according to some embodiments of the present invention.

FIG. 4 shows one embodiment of mold 100 used to form the interior of the embodiment of FIG. 2, and for use with other embodiments according to the present invention. The mold 100 has opening 102 with an outer circumference 104 and has a spiral shaped inward projection 106 that permits the extruded chew interior material to have a through opening. Upon drying, the chew interior shrinks so that a longitudinal crease is formed on the outer circumference.

FIG. 5 is a flowchart illustrating a method 200 for manufacturing a pet chew, according to some embodiments of the present invention.

At 202, a first mixture is provided. The ingredient of the first mixture will be discussed further below. Optionally, the first mixture is obtained by: (a) mixing starch ingredients, for example in a stainless-steel mixer; (b) adding animal meat (e.g., beef, pork, chicken, duck or fish) into the mixer; (c) adding flavoring and coloring into the mixer until ingredients have a smooth texture.

At 204, the first mixture is cooked at a temperature between 70 and 150 degrees Celsius, for example between 95 and 125 degrees Celsius, or between 100 and 120 degrees Celsius. Optionally, the cooking is performed over a few cooking sessions, such that the first mixture is left to cool between cooking sessions. In a non-limiting example, cooking occurs at a temperature range between 100 and 120 degrees Centigrade, and each cooking session lasts between 3 and 5 minutes. Between sessions, the first mixture is left to cool. The cooling may occur at around room temperature (e.g., about 25 degrees Centigrade) or below. In a non-limiting example, the mixture is left to cool between cooking sessions. In a non-limiting example, the duration of each cooling session is between 30 to 60 minutes.

At 206, the cooked first mixture is extruded into one or more elongated strips, via an extruding machine, as known in the art. At 208 the strips are partially dried in an oven or in open air at a temperature between 25 and 70 degrees Celsius until the water percentage in the stirpes is between 20%-35%, for example between 25%-30%.

At 210, the semi-dried strips are ground/cut into grains. In a non-limiting example, each grain may have a maximal dimension of 3 cm. Optionally, each grain has an elongated cylindrical shape or the shape of a rice grain, and has a length between 3 millimeters and 7.5 millimeters and a diameter between 2 and 6 millimeters. The grinding may be performed via an extruding machine having a mold configured for producing the above shaped grains.

At 212, a plurality of the grains is fed to the extruder having a mold circular or spiral mold. At 214 an elongated cylindrical shape (which may have a spiral cross section) is extruded and cut into one or more pieces having lengths described above. Each piece is an inner chew part.

At 216, a syrup is formed from a second mixture including animal meant, glycerin, and starch. In a variant, the syrup includes animal meat (e.g., 85 to 88% by weight of syrup) and glycerin (e.g., 5 to 7% by weight) and starch (e.g., 5 to 8% by weight). The ingredients may be mixed together, until a sticky syrup texture is achieved. The animal meat may include pork, beef, fish, or any other kind of meat At 218, each inner chew part is coated by the syrup to form a pet chew of the present invention. At 220, the pet chew is dried at a temperature between 60 and 70 degrees Celsius, until the water percentage is below 15%, for example between 10% and 13%.

Optionally, the pet chews are sterilized at 222 and packed at 224. In a non-limiting example, the sterilization occurs at 90 to 100 degrees Celsius for 30 to 40 minutes.

The cooking and grinding in above-described method increase the toughness and flexibility of the pet chew. Therefore, the pet chew last longer to than similar products that are manufactured in different manners. The chewiness and toughness of the product cause the pet to chew the pet chew for longer, thereby cleaning the pet's teeth. The inventors have found that a dog chew manufactured as described above last twice as much as a competition pet chew of a similar geometry. Tests performed on several dogs by the inventors show that on average it took 30 to 60 minutes for a dog to consume a pet chew manufactured according to the method of the present invention. On the other hand, it took the same dog about 15 to 30 minutes to consume a similar product having similar geometry, weight, and composition, but manufactured without, the cooking and grinding. The pet chews of the present invention used in these tests were rolls having lengths of 2.5 inches, 4 inches, 7 inches, with mass of 15-20 grams, 100 grams and 140 grams, respectively. The diameter of each roll was between 0.75 inches and 1.5 inches. The other pet chews were produced by Smartbone also rolls having diameters and weights mass similar to those of the pet chews of the present invention. The lengths of the Smartbone rolls were 2.5 inches, 4 inches, 7 inches This method of producing the pet chew allows the chew interior to be made at a desired thickness T (e.g., between 2 and 15 millimeters) mentioned above, while maintaining the malleability of the chew interior. The thickness of the chew interior causes the chewing of the pet chew to be longer. The malleability of the pet chew interior allows the pet chew interior to be foldable into different shapes.

According to a first example, the weight of the ingredients in the first mixture includes:

Plant-based starches (corn starches, wheat flours or sweet potato, tapioca flour, potato, rice flour) 65.9%;

Animal meat (for example, fresh chicken, duck, beef, pork, fish (such as mackerel, salmon)) 16.06%;

Sugar 0.91%;

Salt 0.81%;

Potassium sorbate 0.1%;

Shortening 2.73%;

Gelatin 2.69%;

Glycerin 10.13%;

Coloring 0.67%.

According to a second example, the first mixture includes:
starch in a weight percentage of 5% to 30% or in a weight percentage of 30% to 70% of the first mixture;
animal meat in a weight percentage of 5% to 30% or in a weight percentage of 30% to 70% of the first mixture;
gelatin and/or xanthan gum in a weight percentage of 2% to 20% of the first mixture;
vegetable protein in a weight percentage of 5% to 25% of the first mixture; and
glycerin in a weight percentage of 2% to 10% of the first mixture.

According to a third example, the first mixture includes:
starch in a weight percentage of 5% to 30% of the first mixture;
animal meat in a weight percentage of 30% to 70% of the first mixture;
gelatin and/or xanthan gum in a weight percentage of 2% to 20% of the first mixture;
vegetable protein in a weight percentage of 5% to 25% of the first mixture; and
glycerin in a weight percentage of 2% to 10% of the first mixture.

The starch may be, for example, plant based, such as corn starch, wheat flour, sweet potato flour, tapioca flour, potato flour, rice flour.

The gelatin may include one or more types of animal gelatin (such as pork gelatin or beef gelatin) and/or one or more types of vegetable gelatin.

The vegetable protein may include, for example, soy protein.

The first mixture may also include at least one of the following:
pea flour in a weight percentage of 3% to 20% of the first mixture;
fruit (such as apple, pomegranate, banana, cherry, for example) in a weight percentage of 2% to 10% of the first mixture;
coloring in a weight percentage of 0.3% to 1% of the first mixture; and
sorbic acid in a weight percentage of 0.05% to 0.2% of the first mixture The outer coating can be for example 8 to 15 percent of the total weight and the inner chew material 85% to 92% of the total weight of the final product. An extruded product without the outer coating can also be formed.

The use of gelatin, glycerin, and fiber in the inner chew part increases the product's toughness and flexibility, and cause the product to last longer. The addition of pea flour and fruit increases the nutritional value of the produce, as pea and fruit include vitamins and minerals that are beneficial to the health of the pet (dog)

The inventors have produced a pet chew for dogs including an inner chew part having a composition according to the second example and a coating as described above. The inventor has used a third party to conduct palatability tests and found that the pet chew of the present invention is considerably (27 times) more palatable than Smartbone medium sized bones.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

What is claimed is:

1. A method for manufacturing an edible chew comprising the steps of:
   cooking a first edible mixture at a temperature between 70 and 150 degrees Centigrade, wherein the first edible mixture is a starch-based mixture comprising 60 percent or more by weight of starch material, wherein the first edible mixture further comprises of an animal-based material, and wherein the animal-based material is fresh beef, pork, chicken, duck, or fish in a weight percentage of about 16% of the first edible mixture;
   following the cooking, extruding the first edible mixture into one or more strips;
   partially drying the one or more strips;
   grinding the one or more strip into grains;
   feeding the grains into an extruder, and extruding therefrom an elongated cylindrical shaped inner chew; and
   cutting the elongated cylindrical shaped inner chew into one or more pieces, wherein each piece is an inner chew part;
   coating the inner chew part with a second edible mixture different from the first edible mixture; and
   drying the inner chew part coated with the second edible mixture to form the edible chew, wherein the outer coating is 8 to 15 percent of the total weight of the edible chew and the inner chew material is 85% to 92% of the total weight of the edible chew.

2. The method of claim 1, wherein the second edible mixture is in syrup form, wherein the second edible mixture comprises animal meat, glycerin, and star, wherein the first edible mixture further comprises:
   gelatin and/or xanthan gum in a weight percentage of 2% to 20% of the first edible mixture;
   vegetable protein in a weight percentage of 5% to 25% of the first edible mixture;
   glycerin in a weight percentage of 2% to 10% of the first edible mixture.

3. The method of claim 2, wherein:
   said animal meat is in a weight percentage between 85% and 88% of the second edible mixture;
   said glycerin is in a weight percentage between 5% and 7% of the second edible mixture; and
   said starch is in a weight percentage between 5% and 8% of the second edible mixture.

4. The method of claim 2, wherein the first edible mixture further comprises one or more of the following:
   fruit in a weight percentage of 2% to 10% of the first edible mixture;
   coloring in a weight percentage of 0.3% to 1% of the first edible mixture; and
   sorbic acid in a weight percentage of 0.05% to 0.2% of the first edible mixture.

5. The method of claim 1, wherein each grain has a maximal dimension of 3 cm.

6. The method of claim 1, wherein each grain has a maximal dimension between 3 mm and 7.5 mm.

7. The method of claim 1, wherein partially drying the one or more strips comprises drying the one or more strips until the one or more strips comprise between 25% and 30% of water content.

8. The method of claim 7, wherein the one or more strips are dried in open air at a temperature between 25 and 70 degrees Centigrade.

9. The method of claim 1, wherein the inner chew part coated with the second edible mixture is dried at a temperature between 60 and 70 degrees Centigrade until the inner chew part with the second edible mixture has water content below 15%.

10. The method of claim 1, further comprising sterilizing and packing the edible chew.

11. The method of claim 10, wherein the sterilization is performed at 90 to 100 degrees Celsius for 30 to 40 minutes.

* * * * *